(12) United States Patent
Enderwick et al.

(10) Patent No.: US 9,043,863 B1
(45) Date of Patent: May 26, 2015

(54) POLICY ENFORCING BROWSER

(75) Inventors: Thomas Jeffrey Enderwick, San Francisco, CA (US); Christopher Edward Perret, Carlsbad, CA (US); Azim Ozakil, San Jose, CA (US); Stephen James Scalpone, Portland, OR (US)

(73) Assignee: Symantec Corporation, Mountain View, CA (US)

( * ) Notice: Subject to any disclaimer, the term of this patent is extended or adjusted under 35 U.S.C. 154(b) by 91 days.

(21) Appl. No.: 13/355,529

(22) Filed: Jan. 21, 2012

Related U.S. Application Data

(63) Continuation-in-part of application No. 13/226,351, filed on Sep. 6, 2011.

(60) Provisional application No. 61/461,710, filed on Jan. 22, 2011, provisional application No. 61/402,934, filed on Sep. 7, 2010.

(51) Int. Cl.

| | |
|---|---|
| G06F 17/00 | (2006.01) |
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| H04L 29/06 | (2006.01) |
| H04N 7/16 | (2011.01) |
| G11C 7/00 | (2006.01) |
| G06F 21/60 | (2013.01) |
| G06F 9/445 | (2006.01) |

(52) U.S. Cl.
CPC .......... *G06F 21/604* (2013.01); *G06F 9/44526* (2013.01)

(58) Field of Classification Search
CPC ..... G06F 9/44526; G06F 21/50; G06F 21/51; G06F 21/52; G06F 21/121; G06F 21/128
USPC ...................... 726/1–4, 22–30; 713/165–167, 713/193–194
See application file for complete search history.

(56) References Cited

U.S. PATENT DOCUMENTS

| | | | |
|---|---|---|---|
| 5,138,712 | A | 8/1992 | Corbin et al. |
| 5,737,416 | A | 4/1998 | Cooper et al. |
| 6,005,935 | A | 12/1999 | Civanlar et al. |
| 6,035,403 | A | 3/2000 | Subbiah et al. |
| 6,134,593 | A | 10/2000 | Alexander et al. |
| 6,134,659 | A | 10/2000 | Sprong et al. |

(Continued)

OTHER PUBLICATIONS

Grier et al., Secure web browsing with the OP web browser, 2008, IEEE.*

(Continued)

*Primary Examiner* — Kambiz Zand
*Assistant Examiner* — Trong Nguyen
(74) *Attorney, Agent, or Firm* — Holland & Hart, LLP

(57) ABSTRACT

A web browser that includes a network policy enforcement unit, a storage policy enforcement unit, and an ancillary policy enforcement unit is disclosed. The network policy enforcement unit controls communications between application logic of a web application and data communication APIs. The storage policy enforcement unit controls access between the web application logic and persistent storage APIs. The ancillary policy enforcement unit controls user authentication of the web application logic.

32 Claims, 5 Drawing Sheets

(56) References Cited

U.S. PATENT DOCUMENTS

| | | |
|---|---|---|
| 6,243,468 B1 | 6/2001 | Pearce et al. |
| 6,260,141 B1 | 7/2001 | Park |
| 6,460,140 B1 | 10/2002 | Schoch et al. |
| 6,615,191 B1 | 9/2003 | Seeley |
| 6,801,999 B1 | 10/2004 | Venkatesan et al. |
| 7,134,016 B1 | 11/2006 | Harris |
| 7,949,998 B2 | 5/2011 | Bleisch et al. |
| 2001/0011254 A1 | 8/2001 | Clark |
| 2001/0039625 A1 | 11/2001 | Ananda |
| 2001/0044782 A1 | 11/2001 | Hughes et al. |
| 2001/0051928 A1 | 12/2001 | Brody |
| 2002/0073316 A1 | 6/2002 | Collins et al. |
| 2002/0087883 A1 | 7/2002 | Wohlgemuth et al. |
| 2003/0135756 A1 | 7/2003 | Verma |
| 2003/0177351 A1* | 9/2003 | Skingle ......... 713/156 |
| 2003/0191823 A1 | 10/2003 | Bansal et al. |
| 2004/0107368 A1 | 6/2004 | Colvin |
| 2004/0148525 A1 | 7/2004 | Aida et al. |
| 2004/0167859 A1 | 8/2004 | Mirabella |
| 2004/0168061 A1 | 8/2004 | Kostal et al. |
| 2004/0199766 A1 | 10/2004 | Chew et al. |
| 2004/0202324 A1 | 10/2004 | Yamaguchi et al. |
| 2005/0005098 A1 | 1/2005 | Michaelis et al. |
| 2005/0021992 A1 | 1/2005 | Aida et al. |
| 2005/0049970 A1 | 3/2005 | Sato et al. |
| 2005/0091511 A1 | 4/2005 | Nave et al. |
| 2005/0097348 A1 | 5/2005 | Jakubowski et al. |
| 2005/0222958 A1 | 10/2005 | Hasegawa et al. |
| 2006/0026690 A1 | 2/2006 | Yu et al. |
| 2006/0069926 A1 | 3/2006 | Ginter et al. |
| 2006/0123412 A1 | 6/2006 | Hunt et al. |
| 2007/0157310 A1 | 7/2007 | Kondo et al. |
| 2007/0174424 A1* | 7/2007 | Chen et al. ......... 709/217 |
| 2007/0186112 A1 | 8/2007 | Perlin et al. |
| 2007/0287471 A1 | 12/2007 | Wood |
| 2008/0072297 A1 | 3/2008 | Lu et al. |
| 2008/0134347 A1 | 6/2008 | Goyal et al. |
| 2008/0148363 A1 | 6/2008 | Gilder et al. |
| 2008/0267406 A1 | 10/2008 | Asokan et al. |
| 2009/0055749 A1 | 2/2009 | Chatterjee et al. |
| 2009/0077637 A1* | 3/2009 | Santos et al. ......... 726/5 |
| 2009/0119218 A1 | 5/2009 | Ooki |
| 2009/0217367 A1 | 8/2009 | Norman et al. |
| 2009/0327091 A1 | 12/2009 | Hartin et al. |
| 2010/0050251 A1 | 2/2010 | Speyer et al. |
| 2010/0192234 A1 | 7/2010 | Sugimoto et al. |
| 2010/0228870 A1 | 9/2010 | Terry |
| 2010/0281537 A1* | 11/2010 | Wang et al. ......... 726/22 |
| 2010/0293103 A1 | 11/2010 | Nikitin et al. |
| 2010/0299376 A1 | 11/2010 | Batchu et al. |
| 2010/0306668 A1 | 12/2010 | Williams, III et al. |
| 2011/0138174 A1* | 6/2011 | Aciicmez et al. ......... 713/165 |
| 2012/0137281 A1 | 5/2012 | Kleiner et al. |

OTHER PUBLICATIONS

Pfeiffer et al., Accessibility for the HTML5 <video> element, 2009, ACM.*

Bartoletti et al., Jalapa: Securing Java with Local Policies, 2009.*

* cited by examiner

POLICY ENFORCING BROWSER

CROSS-REFERENCE TO RELATED APPLICATIONS

This application claims priority to U.S. Provisional Application 61/461,710 filed Jan. 22, 2011, and titled "SYSTEM FOR THE DISTRIBUTION AND DEPLOYMENT OF APPLICATIONS, WITH PROVISIONS FOR SECURITY AND POLICY CONFORMANCE", which application is incorporated by reference, in its entirety, into the present application.

This application claims the benefit of U.S. application Ser. No. 13/226,351, filed on Sep. 6, 2011, and titled "SYSTEM FOR THE DISTRIBUTION AND DEPLOYMENT OF APPLICATIONS, WITH PROVISIONS FOR SECURITY AND POLICY CONFORMANCE, which application is incorporated by reference, in its entirety, into the present application. U.S. application Ser. No. 13/226,351, filed on Sep. 6, 2011, claims priority to U.S. Provisional Application 61/402,934, filed on Sep. 7, 2010.

FIELD OF THE INVENTION

The present invention relates generally to browsers and more particularly to browsers that enforce policies relating to a web application.

DESCRIPTION OF THE RELATED ART

Presently, browsers only perform core functions, such as interpreting a document markup language and possibly a scripting language. However, in an environment in which Web applications are delivered to client devices, many of which are mobile and operated by employees in carrying out functions of the business that employs them, such browsers are not sufficient. Browsers in the above mentioned environment need additional functions to aid in the secure operation of such client devices.

BRIEF SUMMARY OF THE INVENTION

One embodiment of the present invention is a web browser that includes a web browser core unit, a network policy enforcement unit, a storage policy enforcement unit and an ancillary policy enforcement unit. The web browser core unit is operable, if enabled, to interpret at least a document markup language contained in a web application, where the web application includes web application logic that uses a data communication facility to communicate over a network and a persistent storage facility to save or retrieve web-application data. The network policy enforcement unit acquires a network enforcement policy, wherein the unit constrains use by the web application logic of the data communication facility according to the network enforcement policy. The storage policy enforcement unit acquires a storage enforcement policy, wherein the unit constrains use by the web application logic of the persistent storage facility according to the storage enforcement policy. The ancillary policy enforcement unit acquires an ancillary enforcement policy, wherein the unit constrains application logic according to said ancillary policy. One such constraint is authentication of a user prior to use of the web-application logic.

Another embodiment of the present invention is a method of enforcing a data communication policy in a computer system. The method includes obtaining a web application, where the web application is operable on the computer system and includes web application logic that requires use of a data communication facility of the computer system, acquiring a network enforcement policy, and constraining use by the web application logic of the data communication facility according to the network enforcement policy.

Yet another embodiment is a method of enforcing a persistent storage policy in a computer system. The method includes obtaining a web application, where the web application is operable on the computer system and includes web application logic that uses a persistent storage facility of the computer system, acquiring a persistent storage policy, and constraining use, by the web application logic, of the persistent storage facility according to the persistent storage enforcement policy.

BRIEF DESCRIPTION OF THE DRAWINGS

These and other features, aspects and advantages of the present invention will become better understood with regard to the following description, appended claims, and accompanying drawings where:

REFERENCE NUMERALS

Figure 1:
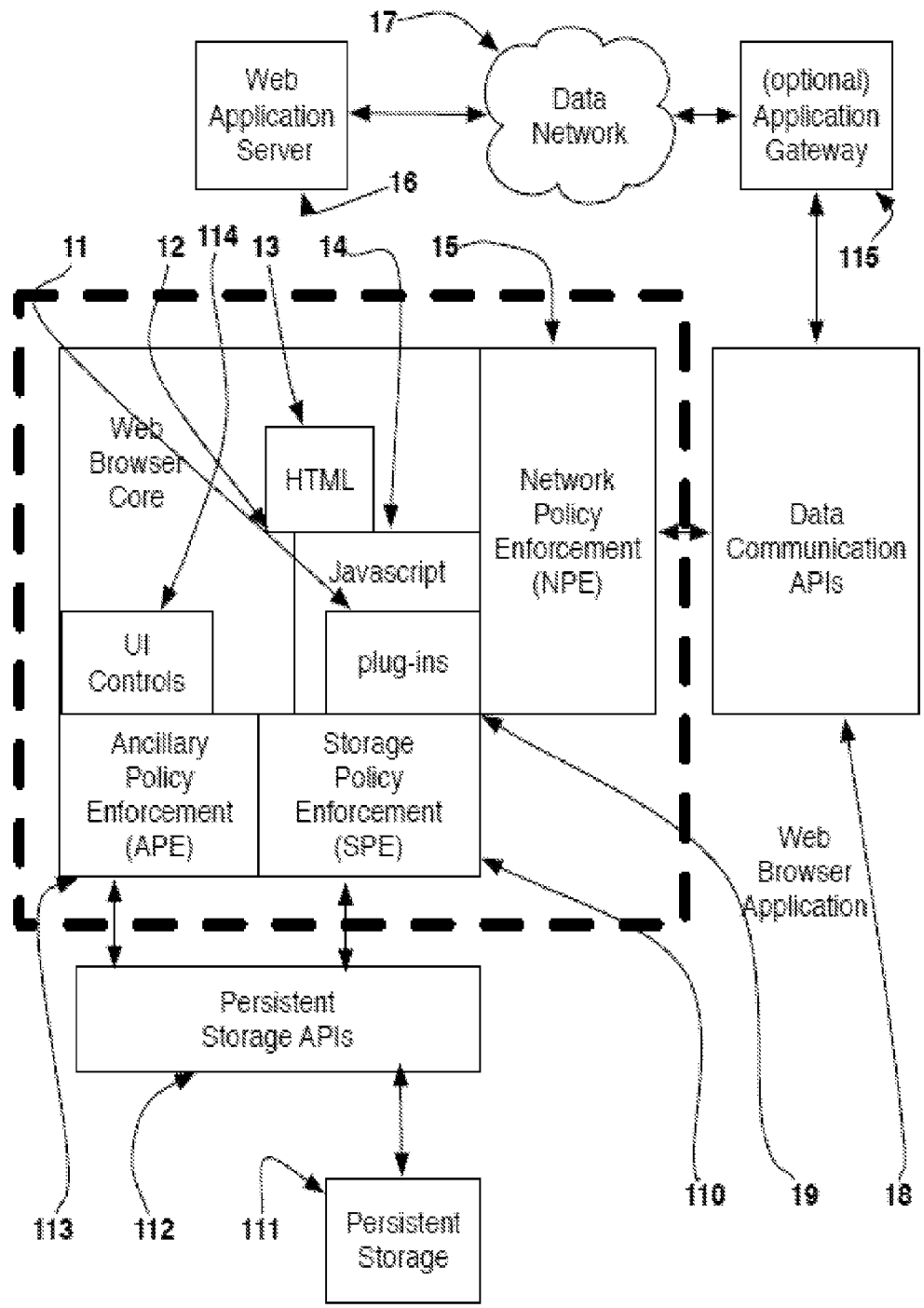
FIG. 1 is a diagram of a representative policy-enforcing browser.

- 11—Policy-enforcing browser
- 12—Web browser core logic and data structures
- 13—HTML, and associated or derived data structures within the web browser application
- 14—Javascript, including loaded Javascript code, the Javascript execution data structures, and any associated logic within the web browser
- 15—Network policy enforcement unit (NPE)
- 16—Web application server
- 17—A network that facilitates the communication of data
- 18—Data communication APIs
- 19—Browser plug-ins, or any other dynamically loaded logic
- 110—Storage policy enforcement unit (SPE)
- 111—Persistent storage
- 112—Persistent storage APIs
- 113—Ancillary policy enforcement unit (APE)
- 114—UI controls
- 115—(optional) application gateway
- 21—Application gateway
- 22—A network that facilitates the communication of data
- 23—A device allowing the manual, offline or build-time provisioning of policy
- 24—Persistent policy storage
- 25—Ancillary policy enforcement unit (APE)
- 26—Network policy enforcement unit (NPE)
- 27—Storage policy enforcement unit (SPE)
- 31—Web application A
- 32—Ancillary policy enforcement unit (APE)
- 33—Policy-enforcing browser
- 34—Web application B 35—Web browser core logic and data structures

DETAILED DESCRIPTION OF THE INVENTION

A typical embodiment of the invention consists of a web browser core coupled with authentication, security and policy enforcement logic, the means to store and receive policy from an authoritative source, and the means to communicate with an identity or authentication service. An embodiment may also contain the means to communicate encryption key values with a key management or key storing system. In a preferred embodiment of the invention, the embodiment works in conjunction with the application gateway 21, as it is described in patent application 61/402,934, which is incorporated by reference into the present application in its entirety.

A web application is typically comprised of, but not limited to, HTML, HTML5, JavaScript code, VBScript code, Java code, CSS, XML, Plug-ins, or Helper applications, or any combination thereof, served from a web application server 16, to a client browser by communicating across a data network 17. In some cases, the web application may be stored locally on the device hosting the web browser, rather than being served across a data network.

The invention allows for a web application to be run within the context of a browser in such a way that policies related to user-authentication, device-authentication, data storage, data encryption and data communication are enforced, independent of the behavior of the aforementioned web application, and independent of traditional web browser policy enforcement.

In a typical embodiment, the invention is deployed on a user-facing endpoint, such as a mobile phone, tablet, personal computer, laptop or kiosk.

Although the invention is titled a "browser", in an embodiment, browsing may not be enabled at all; the embodiment may be simply acting as an execution platform for a single web application, or an execution platform for multiple web applications.

In an alternate embodiment, the invention may be employed as a means to affect the aforementioned policy controls on a dynamic application execution environment. The invention requires neither HTML nor Javascript; in an alternate embodiment, the invention can be applied to other computer languages.

Policy-Enforcing Browser

In a typical embodiment, the invention 11 is based on a conventional web browser core 12. In a typical embodiment, the web browser core 12 includes the logic and data structures needed to receive HTML, parse HTML, and translate HTML into data structures 13. In a typical embodiment, the web browser core 12 additionally includes the logic and data structures needed to receive HTML5, parse HTML5, and translate HTML5 into data structures 13. In a typical embodiment, the web browser core 12 further includes the logic and data structures needed to receive JavaScript, parse JavaScript, translate JavaScript into data structures, execute JavaScript, and generate JavaScript 14. In some embodiments, the logic and data structures needed to perform the same or similar functions with alternative markup or programming languages may be substituted or added.

In a typical embodiment, the invention runs under the control of an operating system (OS), on a computing platform. An embodiment of the invention that does not require an OS is an alternative. In a typical embodiment, the computing platform comprises at a minimum random-access memory (RAM), and a central processing unit (CPU). In a typical embodiment, the computing platform has access to a data network 17, access to persistent storage 111, or both. A data network 17 supports the communication of data between two entities, often at a distance. Persistent storage 111 allows for the storage of data, often locally, such that the data survives events that would harm the data, if the data were otherwise stored in RAM. In an embodiment where the OS and computing platform support access to a data network 17, typically the OS presents data communication APIs (application programming interfaces) 18. In an embodiment where the OS and computing platform supports access to persistent storage, typically the OS presents persistent storage APIs 112.

In a possible embodiment of the invention, web-browser plug-ins 19 may also be bound to the web browser core 12. In a possible embodiment plug-ins may have access to browser data structures, OS system calls, libraries, or data resident on the computing platform. In such an embodiment, all policy enforcement described below is extended to any such plug-ins 19; that is, plug-ins 19 are constrained to policy.

Acquisition of Policy

In a typical embodiment, policy is communicated from an application gateway 21 through a data network 22 and stored in RAM and in persistent policy storage (PPS) 24 by the invention. PPS 24 is simply the storage of relevant policy in persistent storage. In a preferred embodiment, the stored policy is secured such that authenticity and integrity are preserved. In an alternate embodiment, confidentiality may be required as well. In an alternate embodiment, policy may be loaded into invention by alternate means, possibly including manual configuration 23. In a preferred embodiment of the invention, policy may be attached as a partial or complete PPS 24 at the time that the invention is linked or otherwise programmatically transformed into the state in which it is to be distributed, preferentially using the invention described in provisional patent application 61/402,934, which application is incorporated by reference into the instant application.

In the preferred embodiment of the invention, the storage policy enforcement unit (SPE) 27, network policy enforcement unit (NPE) 26, and ancillary policy enforcement unit (APE) 25 draw policy to be enforced from the PPS 24, RAM, or both.

Figure 2:
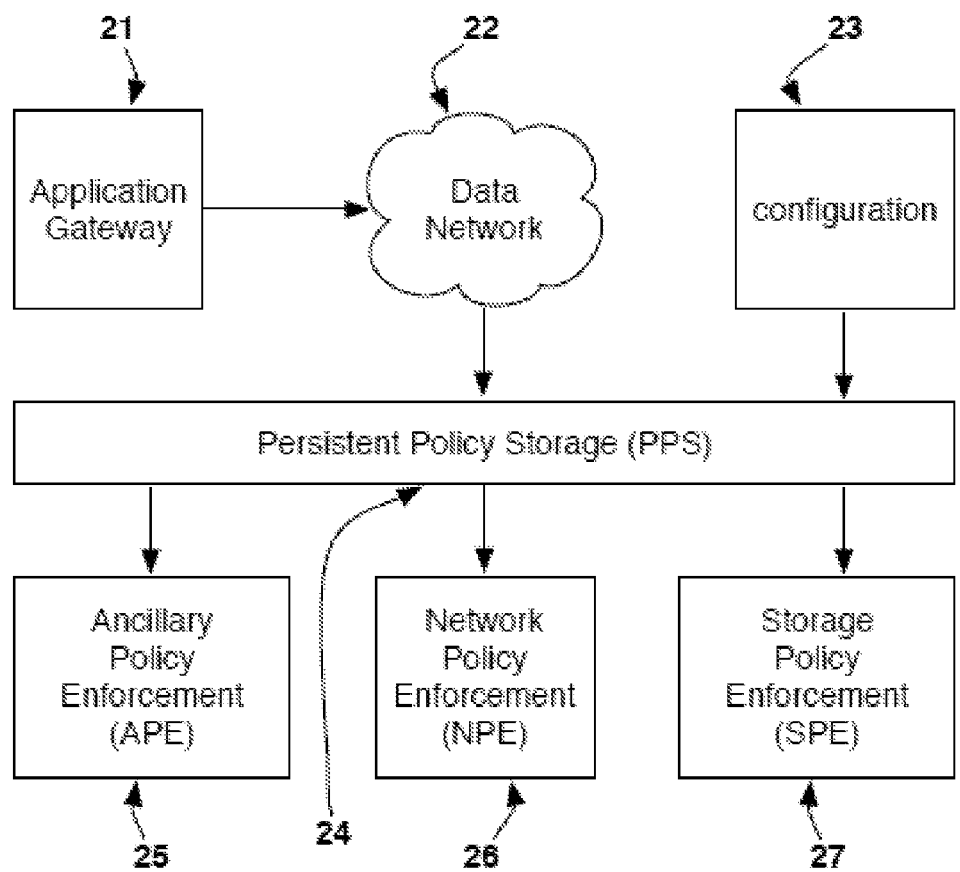
FIG. 2 is a diagram of policy being distributed to the policy enforcing elements within a typical embodiment of a policy-enforcing browser.
Figure 3:
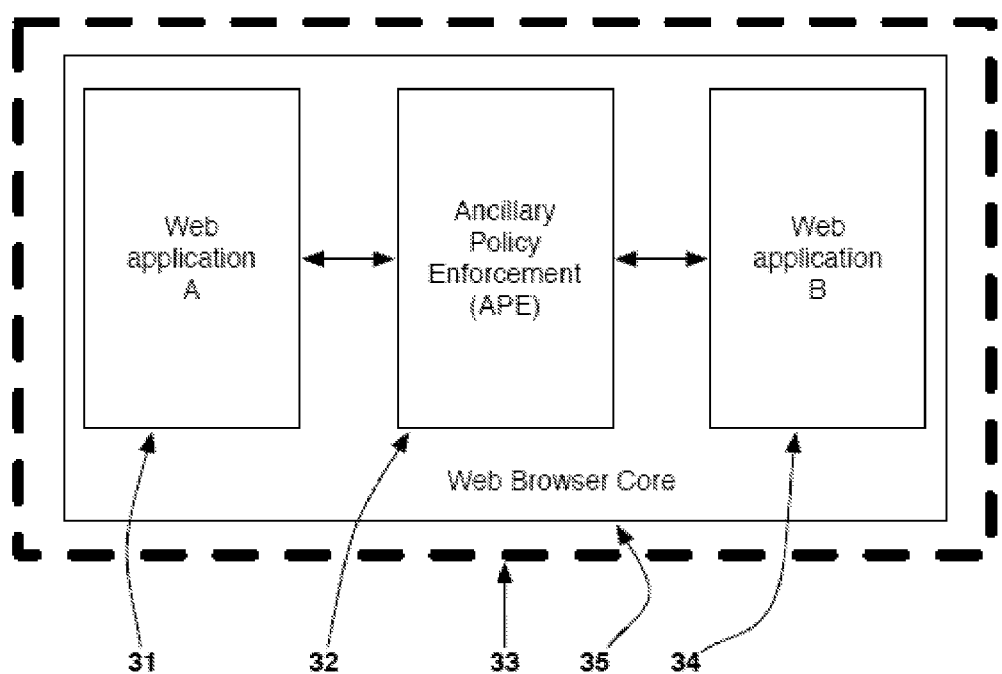
FIG. 3 is a diagram of policy enforcement being applied to interaction between web applications within a typical embodiment of a policy-enforcing browser.

As shown in FIG. 2, the SPE 27, NPE 26 and APE 27 are receivers of policy, and the reception of policy is a "policy event". In the preferred embodiment, they receive policy as policy becomes available in real-time. They may however receive policy only based on "push" events, where multiple policies are sent simultaneously. In an alternative embodiment, they may compel, or "ask for" policy updates. An embodiment that supports the dynamic update of policy may use, but is not limited to, all three types of policy events.

Domains of Policy Enforcement

In the preferred embodiment, the NPE 15 enforces all policy related to the web application's communication over any data network 17. Any attempt by the web application to communicate over or access the network is allowed, blocked or logged, depending on policy. Note that the invention is not limited to the three actions of allowing, blocking or logging an access or communication; rather these are the policy actions available in the preferred embodiment. In a typical embodiment, the NPE 15 logically stands as a gatekeeper between the web-application logic and the OS-provided data communication APIs 18.

In the preferred embodiment, the SPE 110 enforces all policy related to the web application's storage of data to persistent storage. Any attempt by the web application to write to or read from persistent storage is allowed, blocked or logged, depending on policy. Note that the invention is not limited to the three actions of allowing, blocking or logging an access to storage; rather these are the policy actions available in the preferred embodiment. In a typical embodiment, the SPE 110 logically stands as a gatekeeper between the web-application logic and the OS-provided persistent storage APIs 112.

In the preferred embodiment, the APE 113 performs all policy enforcement not covered by the SPE 110 or NPE 15.

In the preferred embodiment, the APE 113 performs user authentication by use of UI controls 114. In doing so, the APE 113 is able to affect the enforcement of policy related to user authentication. In the preferred embodiment, the APE 113 is also responsible for any device authentication aspects, including but not limited to marshalling (i.e., collecting) device credentials, or responding to challenges related to device authentication.

In the preferred embodiment, the APE 113 performs all policy enforcement related to plug-ins. This includes both the acceptance for launch or allowed use of specific plug-ins, as well as the accesses to network, storage, OS aspects, or compute platform aspects by specific plug-ins.

In the preferred embodiment, the APE 113 performs all policy enforcement related to the web-application's access to web browser cookies, or any other browser-specific stored data, such is stored in HTML5.

In the preferred embodiment, the APE 113 performs all policy enforcement related to shared memory (RAM) access, as well as all policy enforcement related to interprocess-communication (IPC) mechanisms, or communication between threads. The availability of IPC or communication between threads to a web application would typically be a function of the OS and of the web browser core 12.

In the preferred embodiment, where the invention is used to run more than a single web application 31 & 34, the APE 32 enforces all policy related to the interaction between the web applications 31 & 34.

In the preferred embodiment, the logic of the web browser core 12 is also subject to policy enforcement by the SPE 110, NPE 15 and APE 113. In such an embodiment, the policy conformance of the aggregate web application and web browser can be assured.

Method of Integration

In the preferred embodiment, the invention leverages all substitution, linking or binding capabilities described in patent application 61/402,934. In practice, the method of integration with the web browser core 12 typically depends on the OS and the actual web browser core 12 utilized.

In some embodiments, the integration is accomplished by editing the browser core 12 source code, such that the affected source code changes cause the policy enforcement and other related logic to be directly or indirectly invoked.

In some embodiments, the integration is accomplished by link-time insertion of the policy enforcement and other related logic, or by other automated re-writing of source or object code, or symbols.

In some embodiments, the integration is accomplished by augmenting the OS, rather than the browser itself. In such an embodiment, the invention spans the boundary between application (web browser) and OS.

In some embodiments, more than one of the above methods of integration may be employed in implementing the invention. In some embodiments, methods of integration not listed above may be employed.

Figure 4:
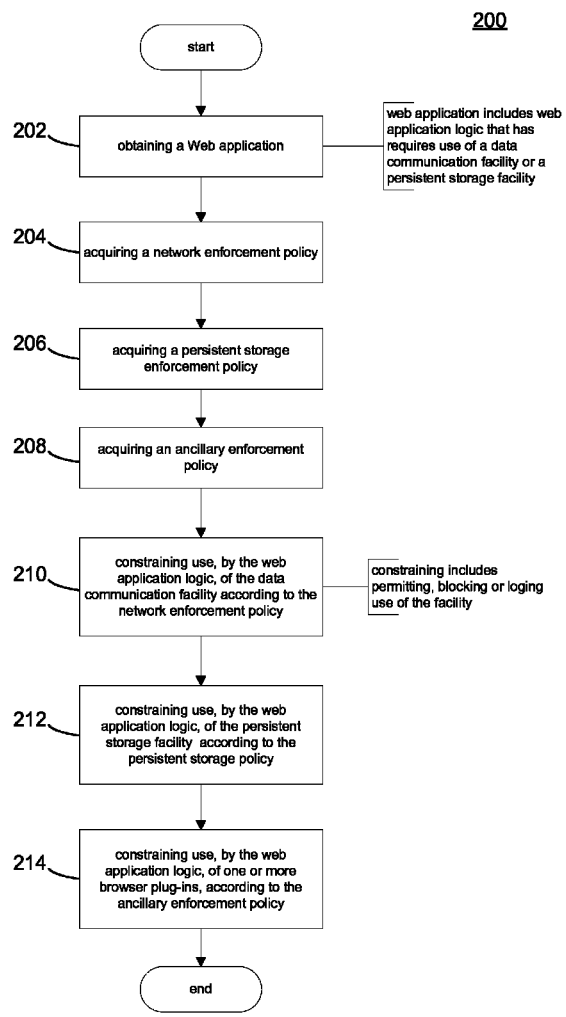
FIG. 4 is a flow chart of a method in accordance with an embodiment of the present invention.

FIG. 4 is a flow chart of a method in accordance with an embodiment of the present invention. In step 202, a Web application is obtained by an end-point device such as the one described in FIG. 5. In one embodiment, the Web application is obtained externally. In another embodiment, the Web application is resident on the end-point device. In step 204, the device acquires a network enforcement policy. In step 206, the device acquires a persistent storage policy. In step 208, the device acquires an ancillary enforcement policy. In step 210, the device constrains the use, by the web application logic, of a communication facility according to the network enforcement policy. In step 212, the device constrains the use, by the web application logic, of a persistent storage facility. In step 214, the device constrains the use, by the web application logic, of one or more browser plug-ins. In one embodiment, in step 214, the ancillary enforcement policy constrains whether or not a particular user can use the web application logic.

Figure 5:
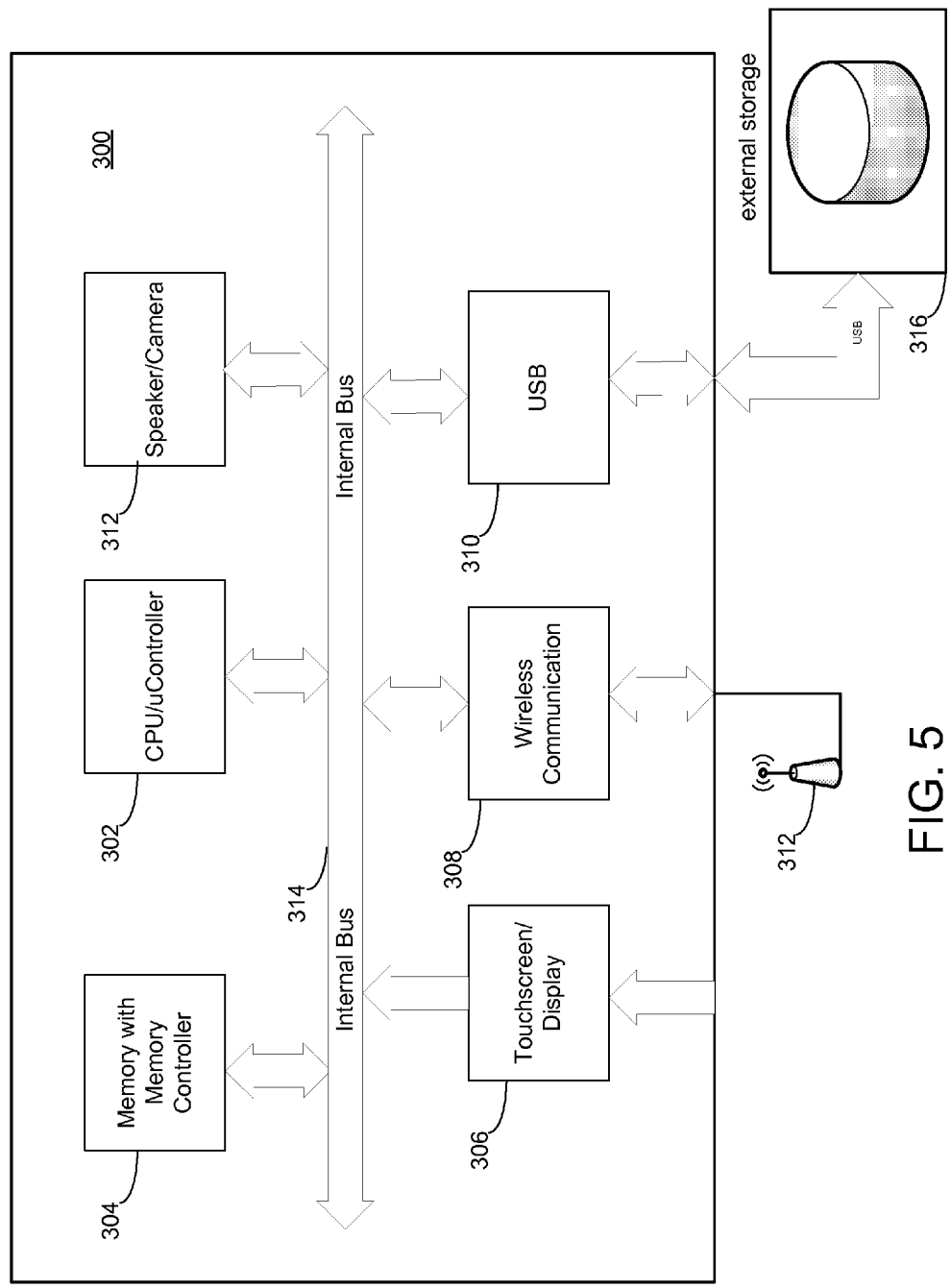
FIG. 5 is a block diagram of an end-point computing device.

FIG. 5 shows a block diagram of a representative end-point device 300. The device includes a CPU/micro-Controller 302, a memory and memory controller 304, a touchscreen and display 306, a wireless communications facility 308, and a USB bus controller 310, and other I/O such as a speaker and/or a camera 312, all connected to each other by an internal bus 314. The CPU or microcontroller 302 executes instructions that are loaded or present in the memory 304 which operates under the control of a memory controller. The user can operate the device by means of input and commands via the touchscreen 306, which is also used to display the device output. The wireless communication interface 308 connects the device 300 to a wireless network and/or a local area network via antenna 312. The USB bus contoller 310 allows the device 300 to connect to any peripheral device 316 having such a USB interface. One peripheral device 316 is an external disk drive, CD drive, flash memory device, or any computer readable medium containing computer program instructions that can be executed by the CPU 302 to carry out functions of an application program. Alternatively, a wireless network available via antenna 312 can be used to load computer program instructions into the device 300. In particular, in one embodiment, a browser in accordance with the present invention is loaded via the external storage drive. In another embodiment, a browser in accordance with the present invention is loaded via the wireless network. In another embodiment, the software operating system is loaded via the external storage drive, the policies of the present invention being integrated into the operating system. In another embodiment, the software operating system is loaded via the wireless communication interface 308 from a wireless network accesible via antenna 312.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system of a policy enforcing browser comprising:
a processor;
memory in electronic communication with the processor;
instructions stored in the memory, the instructions being executable by the processor to:
  interpret at least a document markup language contained in a web application, the web application including web application logic that uses a data communication facility to communicate over a network and a persistent storage facility to save or retrieve web-application data;
  acquire a network enforcement policy for constraining use by the web application logic of the data communication facility according to said network enforcement policy;

acquire a storage enforcement policy for constraining use by the web application logic of the persistent storage facility according to said storage enforcement policy;

control access to the persistent storage facility by limiting access of said web application logic to one or more persistent storage application program interfaces (APIs); and acquire an ancillary enforcement policy for constraining the web application logic according to said ancillary enforcement policy, and constraining operation of at least one browser plug-in program according to said ancillary enforcement policy, including permitting a first plug-in program to access the persistent storage facility and preventing a second plug-in program from accessing the persistent storage facility.

2. The system of claim 1,
wherein the data communication facility is available via one or more data communication application program interfaces (APIs); and
wherein the web application logic uses the data communication facility by means of the data communication APIs.

3. The system of claim 1,
wherein the persistent storage facility is available via the one or more persistent storage APIs; and
wherein the web application logic uses the persistent storage facility by means of the one or more persistent storage APIs.

4. The system of claim 1, wherein network enforcement policy includes blocking use, allowing use, or logging use of the data communication facility.

5. The system of claim 1, wherein storage enforcement policy includes blocking use, allowing use, or logging use of persistent storage facility.

6. The system of claim 1, wherein the document markup language is hypertext markup language (HTML).

7. The system of claim 1, wherein the document markup language is hypertext markup language 5 (HTML5).

8. The system of claim 1, wherein said instructions being executable by the processor to interpret JavaScript.

9. The system of claim 1, wherein said ancillary enforcement policy includes authentication of a device on which the web application logic is permitted to run.

10. The system 9, wherein authentication includes responding to challenges related to device authentication.

11. The system 9, wherein authentication includes collecting device credentials.

12. The system of claim 1, wherein said instructions being executable by the processor to acquire the network enforcement policy from a policy storage area into which said network enforcement policy was loaded.

13. The system of claim 1, wherein said instructions being executable by the processor to acquire the storage enforcement policy from a policy storage area into which said storage enforcement policy was loaded.

14. The system of claim 1,
wherein at least one browser plug-in program is available to the browser.

15. The system of claim 14, wherein constraining operation includes permitting or preventing use of the plug-in program.

16. The system of claim 14, wherein constraining operation includes permitting or preventing access to a network by the plug-in program.

17. The system of claim 14, wherein constraining operation includes permitting or preventing access to persistent storage by the plug-in program.

18. The system of claim 14, wherein constraining operation includes permitting or preventing access to the operating system by the plug-in program.

19. The system of claim 1, wherein said ancillary policy includes controlling access to browser-specific stored data.

20. The system of claim 19, wherein stored data specific to the browser includes cookies.

21. The system of claim 1,
wherein communication between at least two processes is available; and
wherein said instructions being executable by the processor to control the communication between the processes.

22. The system of claim 1,
wherein communication between at least two threads is available; and
wherein said instructions being executable by the processor to control communication between the threads.

23. The system of claim 1,
wherein a web browser supports at least two web applications; and
wherein said instructions being executable by the processor to control interactions between the at least two web applications.

24. The system of claim 1, wherein a web browser core of the policy enforcing browser is subject to the storage enforcement policy, the network enforcement policy and the ancillary enforcement policy.

25. The system of claim 1,
wherein constraining the web application logic includes at least authenticating a user prior to use of the web application logic.

26. A method of enforcing a data communication policy in a computer system, the method comprising:
obtaining a web application, said web application operable on the computer system and including web application logic that uses a persistent storage facility and a data communication facility of the computer system;
controlling access to the persistent storage facility by limiting access of said web application logic to one or more persistent storage application program interfaces (APIs);
acquiring an ancillary enforcement policy relating to plug-in programs;
preventing installation of a plug-in program according to the ancillary enforcement policy;
acquiring a network enforcement policy; and
constraining use by the web application logic of the data communication facility according to the network enforcement policy.

27. The method of claim 26, wherein the web application is run by browser software running on the computer system.

28. The method of claim 26, wherein the web application is run by an operating system running on the computer system.

29. The method of claim 26, wherein network enforcement policy includes blocking use, allowing use, or logging use of the data communication facility.

30. A method of enforcing a persistent storage policy in a computer system, the method comprising:
obtaining a web application, said web application operable on the computer system and including web application logic that uses a persistent storage facility of the computer system;

controlling access to the persistent storage facility by limiting access of said web application logic to one or more persistent storage application program interfaces (APIs);
acquiring an ancillary enforcement policy relating to plug-in programs;
permitting a first plug-in program to access the persistent storage facility according to the ancillary enforcement policy;
preventing a second plug-in program from accessing the persistent storage facility according to the ancillary enforcement policy;
acquiring a persistent storage enforcement policy; and
constraining use, by the web application logic, of the persistent storage facility according to the persistent storage enforcement policy.

31. The method of claim 30, wherein the persistent storage enforcement policy includes blocking use, allowing use, or logging use of persistent storage facility.

32. A method of enforcing an ancillary policy in a computer system, the method comprising:
obtaining a web application, said web application operable on the computer system and including web application logic that uses a persistent storage facility and one or more installed browser plug-in programs,
controlling access to the persistent storage facility by limiting access of said web application logic to one or more persistent storage application program interfaces (APIs);
acquiring an ancillary enforcement policy relating to the plug-in programs;
preventing installation of a plug-in program according to the ancillary enforcement policy; and
constraining use by the web application logic of the one or more installed browser plug-in programs according to the ancillary enforcement policy.

* * * * *